(12) United States Patent
Davey et al.

(10) Patent No.: US 11,805,120 B1
(45) Date of Patent: *Oct. 31, 2023

(54) AUDIO TOKENS FOR MULTI-FACTOR AUTHENTICATION

(71) Applicant: United Services Automobile Association (USAA), San Antonio, TX (US)

(72) Inventors: Richard Davey, San Antonio, TX (US); Gabriel C. Fernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 139 days.

This patent is subject to a terminal disclaimer.

(21) Appl. No.: 17/475,920

(22) Filed: Sep. 15, 2021

Related U.S. Application Data (63) Continuation of application No. 16/381,463, filed on Apr. 11, 2019, now Pat. No. 11,153,307.

(60) Provisional application No. 62/656,767, filed on Apr. 12, 2018.

(51) Int. Cl.
*G06F 21/00* (2013.01)
*H04L 9/40* (2022.01)
*H04M 7/12* (2006.01)

(52) U.S. Cl.
CPC .......... *H04L 63/0853* (2013.01); *H04L 63/18* (2013.01); *H04M 7/1295* (2013.01); *H04L 2463/082* (2013.01)

(58) Field of Classification Search
CPC ................ H04L 63/0853; H04L 63/18; H04L 2463/082; H04M 7/1295
See application file for complete search history.

(56) References Cited

U.S. PATENT DOCUMENTS

| 7,275,156 | B2 * | 9/2007 | Balfanz | H04L 63/0823 713/168 |
| 7,581,096 | B2 * | 8/2009 | Balfanz | H04L 12/1822 713/168 |
| 8,613,066 | B1 * | 12/2013 | Brezinski | H04L 63/10 713/168 |
| 8,661,515 | B2 * | 2/2014 | Meylemans | H04W 12/08 726/7 |

(Continued)

OTHER PUBLICATIONS

Al-Kateeb et al., "A novel approach for audio file encryption using hand geometry," Multimedia Tools and Applications, Mar. 8, 2020, 79:19615-19628.

*Primary Examiner* — Kendall Dolly
(74) *Attorney, Agent, or Firm* — Fish & Richardson P.C.

(57) ABSTRACT

Techniques are described for performing multi-factor authentication of a user during a service session, based at least partly on a code conveyed using an audio file. A code is generated that corresponds to the user and/or their user device. A playback device that is registered to the user can be used to output a playback of an audio file that encodes the code. The playback of the audio file is conveyed through the service session by the user device and received by a backend server, which analyzes the playback of the audio file to extract the code. The user can be authenticated based at least partly on verifying the code that is extracted from the playback of the audio file, by comparing the extracted code to the code that was generated and sent to the playback device.

20 Claims, 6 Drawing Sheets

(56) References Cited

U.S. PATENT DOCUMENTS

| | | | | |
|---|---|---|---|---|
| 8,925,062 | B1* | 12/2014 | Brezinski | G06F 21/32 |
| | | | | 713/168 |
| 10,574,692 | B2* | 2/2020 | Drake | H04L 63/0853 |
| 2009/0177742 | A1* | 7/2009 | Rhoads | G06F 21/16 |
| | | | | 709/203 |
| 2011/0258121 | A1* | 10/2011 | Kauniskangas | G06Q 20/306 |
| | | | | 705/67 |
| 2011/0277023 | A1* | 11/2011 | Meylemans | G06F 21/335 |
| | | | | 726/7 |
| 2017/0346851 | A1* | 11/2017 | Drake | H04L 9/0838 |

* cited by examiner

# AUDIO TOKENS FOR MULTI-FACTOR AUTHENTICATION

CROSS-REFERENCE TO RELATED APPLICATIONS

This application is a continuation application of and claims priority under 35 U.S.C. § 120 to U.S. application Ser. No. 16/381,463, filed on Apr. 11, 2019, which is related to, and claims benefit of, U.S. Provisional Patent Application Ser. No. 62/656,767, titled "Audio Tokens for Multi-Factor Authentication," which was filed on Apr. 12, 2018, the entire contents of each of which are incorporated herein by reference.

BACKGROUND

Technological advancement in online security systems has led to more frequent use of multi-factor authentication for identity verification. Multi-factor authentication enables heightened security compared to single-step verification, by requiring two or more different pieces of evidence to confirm a person's identity prior to granting that person access to requested information. While multi-factor authentication provides an improvement over single-step verification, the traditional multi-factor verification is still subject to weaknesses. In particular, if the evidence used for authentication is transmitted over a network without first being encoded or encrypted, the evidence could be intercepted by a third party, potentially resulting in an improper grant of access to the protected data to the intercepting third party. Additionally, persons who have limited access to online technology may not be able to participate in multi-factor authentication if either of the pieces of evidence required for authentication can only be accessed or submitted using the Internet. Further, persons with vision impairment or limited vision may be incapable of accessing authentication factors that are displayed visually, such as a number displayed on a screen.

SUMMARY

Implementations of the present disclosure are directed to multi-factor authentication technology. More particularly, implementations of the present disclosure are directed to using dual tone multiple frequency tones as part of a multi-factor authentication process.

In general, innovative aspects of the subject matter described in this specification can be embodied in methods that include operations of: initiating a service session with a user device operated by a user; generating a code that responds to the user; transmitting a signal that conveys the code over a network to a playback device that is registered to the user; receiving a playback of an audio file that encodes the code that is output by the playback device and conveyed through the service session by the user device; analyzing the playback of the audio file to extract the code encoded in the audio file; and, based at least partly on verifying the extracted code, verifying an identity of the user.

These and other implementations may each optionally include one or more of the following features: the operations further include encoding the code in an audio file, and/or including the audio file in the signal; the signal is encrypted; the user is initially authenticated through a first mode of authentication during the service session, and/or verifying the extracted code includes a second mode of authentication for authenticating the user; identifying the playback device includes determining a user ID associated with the user and/or determining the playback device registered to the associated user ID; identifying the playback device further includes accessing a data structure that stores an association between the user ID and a network address of the playback device; the operations further include retrieving, from the data structure, the network address of the playback device that is associated with the user ID; the playback device is a portable computing device; the playback device is a token device; the user device is a computing device operated by the user; the user device is a telephone operated by the user; and/or the audio file includes one or more dual tone multiple frequency (DTMF) tones.

Other implementations of any of the above aspects include corresponding systems, apparatus, and computer programs that are configured to perform the actions of the methods, encoded on computer storage devices. The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide various technical advantages and/or technical improvements compared to previously available solutions. Through use of multi-factor authentication, the implementations reduce the likelihood of incorrect or failed user authentication. By reducing the likelihood of failed user authentication, the implementations may avoid the need for individuals to repeatedly attempt authentication prior to achieving successful authentication. By avoiding unnecessary repetition of authentication attempts prior to successful authentication, the implementations result in improved efficiency and security in user authentication, fewer repeated attempted, and therefore less expenditure of computing resources (e.g., processing power, network capacity, active memory, storage space, etc.) compared to traditional systems that are required to expend computing resources to accommodate multiple attempts. Another advantage of the implementations is the use of encoded audio tones, such as encoded dual tone multiple frequency (DTMF) tones, for user authentication, which improves security of authentication compared to current forms of multi-factor authentication, given that certain audio tones, including DTMF tones, are not as easily discerned by human hearing as spoken language, and are not typically decodable by humans.

In traditional modes of authentication, individuals are often required to read a numeric or text passcode that is used as evidence for user authentication. This presents a challenge to visually impaired individuals as they may have difficulty reading a numeric or text passcode. Implementations provide an improved method of authentication for visually impaired individuals by using playback of an audio file captured and transmitted by a user device, rather than entry of a numeric or text passcode, as the form of evidence required for authentication. In addition, in traditional authentication methods, the evidence required for authentication is often submitted through entry of the evidence on an Internet-based user interface. Individuals with limited access to technology may be unable to access Internet-based user interfaces for entry of authentication evidence, and thus may be unable to participate in many traditional methods of authentication. Implementations provide an improved method of authentication for individuals with limited access to technology by allowing for the transmission of the playback of an audio file over a telephone call, rather than online entry of a passcode, as the method of submitting evidence for authentication.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to multi-factor authentication technology in a service environment. In many service environments, the identity of the user of the particular service is authenticated prior to providing the user with the service or access to information related to the service. In traditional modes of authentication, users are often required to read a numeric or text passcode displayed on a screen as part of the authentication process. This presents a challenge to visually impaired individuals as they may have difficulty reading the passcode. Additionally, passcodes necessary for authentication are typically provided over the Internet, either on a website or through e-mail. Users without access to Internet technology may be unable to access these passcodes, and, therefore, may be unable to complete the authentication process.

Implementations of the present disclosure provide a technique for using audio tones as a form of second stage authentication to enable verification of user identity during remote transactions. In some implementations, a processor executes a process to initiate a service session with a user device that is operated by a user. The processor generates a code that corresponds to the user and transmits a signal conveying the code over a network to a playback device that is registered to the user. The playback device outputs a playback of an audio file encoding the code. The playback of the audio file is conveyed through the service session by the user device and is received by the processor. The processor analyzes the playback of the audio file to extract the code that is encoded within the audio file. Verification of the user is performed by the processor based at least partly on verifying the code extracted from the playback of the audio file. In some implementations, verification of the user's identity is conducted by verifying the code extracted from the playback of the audio file based on the code generated by the processor.

Figure 1:
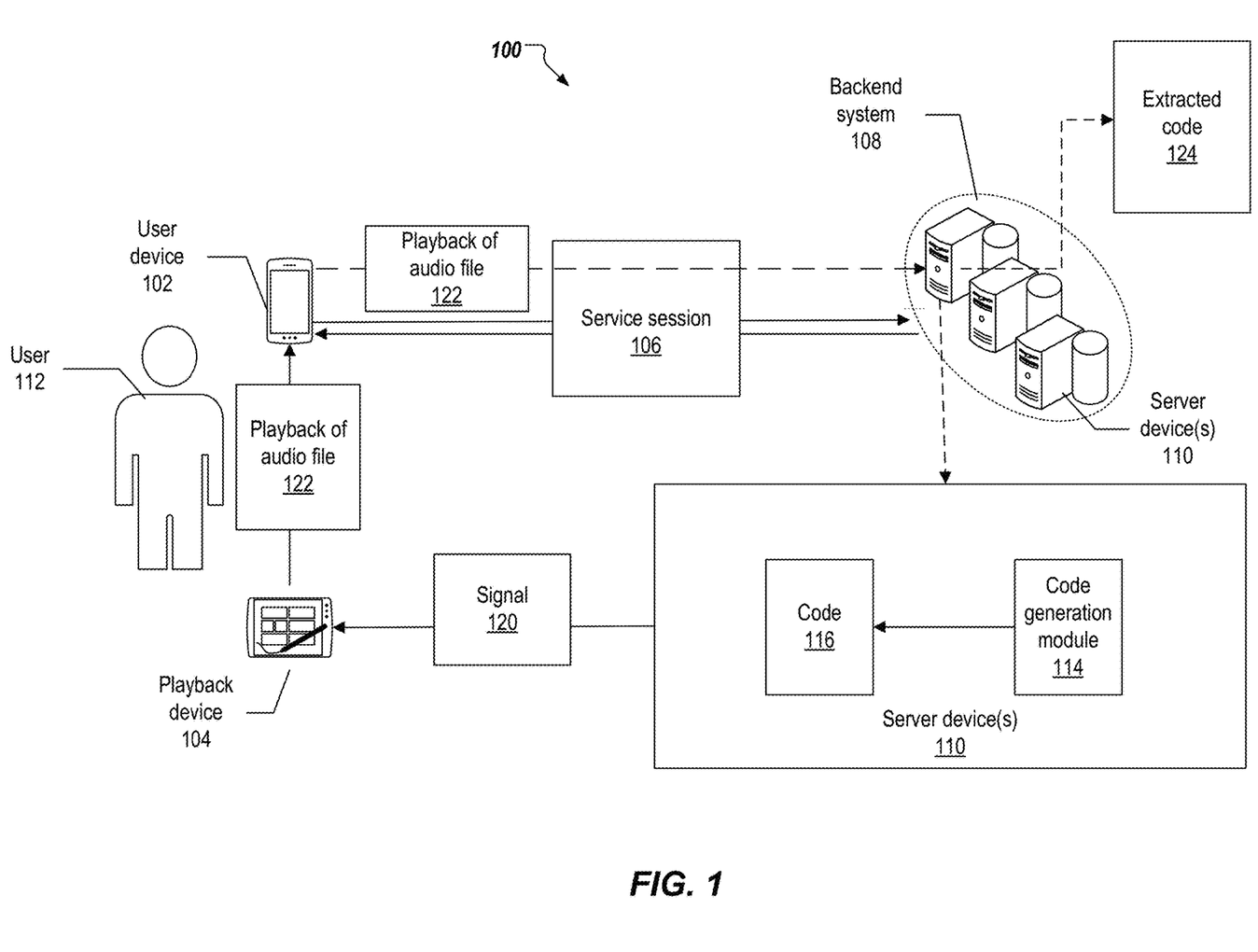
FIG. 1 depicts an example architecture in accordance with implementations of the present disclosure.

FIG. 1 depicts an example architecture 100 in accordance with implementations of the present disclosure. In the depicted example, the example architecture 100 includes a user device 102, a playback device 104, and backend system 108. In FIG. 1, the user device 102 and the playback device 104 are depicted as a mobile computing devices (e.g., a smartphone, a tablet). It is contemplated that user device 102 can include any appropriate type of telephonic or computing device such as a landline phone, a cellular phone, a smartphone, a laptop computer, a tablet computer, a handheld computer, a smart television, a digital assistant, or any appropriate combination of any two or more of these devices, or other processing devices. In some examples, the user device 102 can include a microphone. It also is contemplated that the playback device 104 can include any appropriate type of computing device such as a cellular phone, a smartphone, a laptop computer, a tablet computer, a handheld computer, a smart television, a digital assistant, or any appropriate combination of any two or more of these devices, or other processing devices. In some examples, the playback device 104 is a token device that is arranged solely for the purpose of playing an audio file, and may not have other functions (or may have limited other functions) apart from the playback of the audio file. Such a token device may be headless, in that it does not include a display or other visually perceivable user interface.

In the depicted example, backend system 108 includes at least one server device 110. In some implementations, the at least one server device 110 hosts one or more computer-implemented services that users can interact with using computing devices. For example, the backend system 108 can host computer-implemented services of an enterprise, such as a financial institution, an e-commerce retailer, and so forth.

In some implementations, the at least one server device 110 of the backend system 108 includes at least one server and at least one data store. In the example of FIG. 1, the at least one server device 110 is intended to represent various forms of servers including, but not limited to, a web server, an application server, a proxy server, a network server, and/or a server pool. In general, the at least one server device 110 accepts requests for application services and provide such services to any number of client devices (e.g., the user device 102). In some implementations, one or more data stores of the at least one server device 110 store one or more databases. In some implementations, the at least one server device 110 includes an interactive voice recognition (IVR) system.

In the depicted example, a user 112 interacts with the backend system 108 by using user device 102 to request initiation of a service session 106 with backend system 108. In an example context, user 112 can be a customer of a financial institution (e.g., bank or a credit card company), who interacts with the financial institution through one or more applications hosted on the at least one server device 110 of backend system 108. For example, user 112 can interact with the computer-implemented services hosted on the server devices 110 of backend system 108 to perform banking activities. In some examples, user device 102 includes a computer-executable application (e.g., mobile app) executed thereon, which can be used to log into, and interact with computer-implemented services. In some examples, user device 102 includes a web browser application (e.g., web app) executed thereon, which can be used to log into, and interact with computer-implemented services. In other examples, user 112 can interact with an IVR system hosted on the at least one server device 110 of backend system 108 through a telephone call placed using user device 102. In accordance with implementations of the present disclosure, user 112 can interact with the computer-implemented services hosted on the at least one server device 110 of backend system 108 to perform transactions with third parties, such as electronic wire transfers.

In the depicted example, playback device 104 is registered to user 112. In some examples, playback device 104 is registered using a unique serial number. In other examples, playback device 104 is registered using a user ID associated with user 112. In yet other examples, playback device 104 is registered using biometric features of the user, such as the user's fingerprint or the user's retinal blood vessel pattern.

In the depicted example, server device 110 can generate a code 116 through a code generation module 114. In other examples, playback device 104 can generate code 116. In yet other examples, playback device 104 can generate a second code based on receiving a signal 120 from server device 110 conveying code 116. In some examples, code 116 is generated based on the date the service session 106 is initiated. In other examples, code 116 is generated based on the time the service session 106 is initiated. In yet other examples, code 116 is generated based on a combination of both the date and the time that service session 106 is initiated. The code may also be generated based on a combination of the date and time that a signal 120 sent from server device 110 was received the playback device 104. In other examples, code 116 is generated based on the number of times an event is executed. For example, code 116 can be generated based on the number of times that user 112 has initiated a service session 106. In some implementations, code 116 is generated using a common protocol shared between playback device 104 and server device 110. In some examples, code 116 is generated based on the current timestamp of when service session 106 was initiated and a cryptographic seed value known by both the playback device 104 and server device 110.

In some examples, code 116 may be composed of numbers. In other examples, code 116 may be composed of letters. In yet other examples, code 116 may be composed of tones, such as tones that correspond to numbers and/or letters. In some examples, code 116 may be composed of dual tone multiple frequency (DTMF) tones. In some examples, code 116 may be composed of symbols. In other examples, code 116 may be composed of a combination of letters, numbers, tones, or symbols.

In the depicted example, server device 110 transmits a signal 120 to playback device 104. In some examples, signal 120 conveys code 116 from server device 110 to playback device 104. In other examples, signal 120 conveys an audio file generated by server device 110 encoding code 116. Signal 120 may be transmitted by server device 110 over a network. The network can include a large computer network, such as a local area network (LAN), a wide area network (WAN), the Internet, a cellular network, a telephone network (e.g., PSTN), or any appropriate combination thereof connecting any number of communication devices, mobile computing devices, fixed computing devices, and backend systems. The network may be accessed over a wired and/or a wireless communications link. For example, mobile computing devices, such as smartphones can utilize a cellular network to access the network. In other examples, the network can be accessed over an Internet webpage. For example, desktop, laptop, tablet, and handheld computing devices can utilize the Internet to access the network.

In some examples, server device 110 can encode an audio file with code 116 generated by code generation module 114. In other examples, playback device 104 can generate an audio file that encodes code 116. In some examples, playback device 104 generates an audio file encoding code 116 in response to receiving a signal 120 from server device 110. In yet other examples, playback device 104 can generate a second code based on receiving a signal 120 from server device 110 that conveys code 116. In some examples, playback device can generate an audio file encoding a second code that is generated by playback device 104 in response to receiving signal 120 from server device 110 conveying code 116. The audio file may be composed of at least one tone. In other examples, the audio file can be composed of at least one DTMF tone.

In the depicted example, playback device 104 outputs a playback of audio file 122. In some examples, playback of audio device 122 is based on an audio file that encodes code 116 generated by server device 110. In other examples, playback of audio file 122 is based on an audio file that encodes a code generated by playback device 104 in response to receiving signal 120. In some examples, playback of audio file 122 is based on an audio file transmitted by server device 110 to playback device 104. In other examples, playback of audio file 122 is based on an audio file generated by playback device 104. The playback of audio file 112 may be composed of at least one tone. In other examples, playback of audio file 112 is composed of at least one DTMF tones.

In the depicted example, user device 102 conveys playback of audio file 122 through service session 106. User device 102 may convey playback of audio file 122 through service session 106 over a network. In the depicted example, playback of audio file 122 conveyed by user device 102 through service session 106 is received by server device 110 in backend system 108. In some examples, server device 110 analyzes playback of audio file 122 to obtain extracted code 124 that is encoded in the playback of audio file 122. In some examples, server device 110 can use a cryptographic seed to obtain extracted code 124.

Extracted code 124 may be used to verify the identity of user 112. In some examples, verification of user identity is conducted by comparing extracted code 124 with the code 116 generated by server device 110 or playback device 104. Verification of extracted code 124 may be performed using a cryptographic seed. In some implementations, the playback device 104 is configured to include a seed that is used to generate a random or pseudo-random number. The number can be encoded into the audio file (e.g., using DTMF codes) that is played back to verify the user's identity. The playback of the audio file is conveyed, over service session 106, to the server 110, which then decodes the audio file 122 to extract the code. The server 106 knows the particular seed that is associated with playback device 104, and performs its own generation of the random or pseudo-random number based on the seed. If the code that is extracted from the playback of the audio file 124 matches the code that is independently generated on the server 106 based on the seed of playback device 104, the user's identity is verified. In some examples, the generation of the number is performed on playback device 104 and server 106 with a particular periodicity, such that the code rotates over time (e.g., every minute) to prevent spoofing of the code and unauthorized access.

Figure 2:
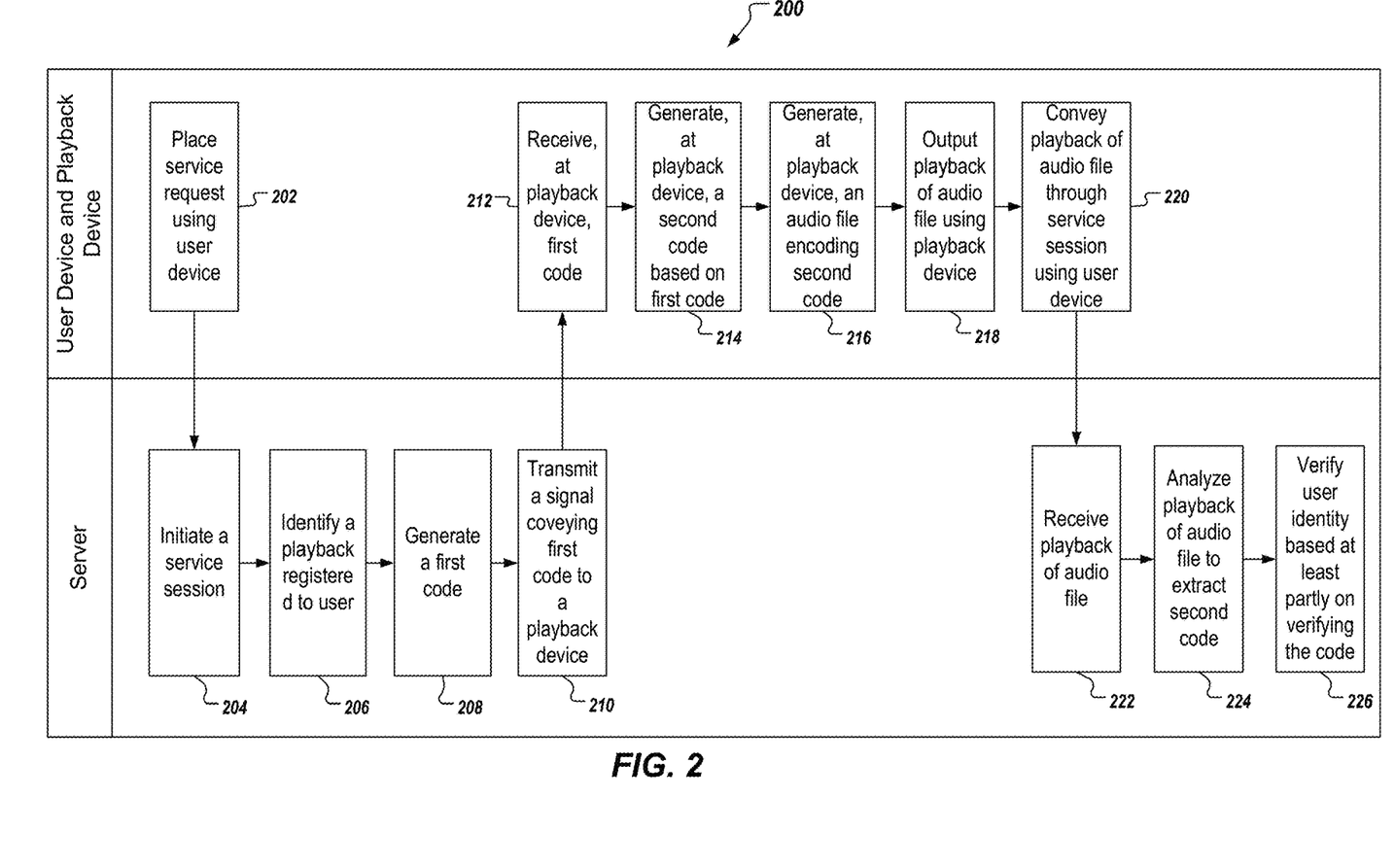
FIGS. 2-5 depict example processes that can be executed in accordance with implementations of the present disclosure.

FIG. 2 depicts an example process 200 that can be executed in accordance with implementations of the present disclosure. The example process 200 can be provided by one or more computer-executable programs executed by one or more computing devices. In some examples, the example process 200 can be performed to conduct second stage authentication for verifying a user's identity, in a multi-factor authentication process.

A request to initiate a service session is placed by user using a user device (202). The user device may be a telephone. In other examples, the user device may be a computing device and the request to initiate a service session can be placed using an online or mobile application on a computing device. In response to a request to initiate a service session, a server initiates a service session (204). The user may be authenticated through a first mode of authentication during the service session. In some implementations, the first mode of authentication can include entry of a password. In other implementations, the first mode of authentication can include entry of a personal identification number. The first mode can also include biometric authentication techniques, such as authentication based on fingerprint, retinal scan, facial recognition, voice recognition, and so forth.

The server identifies a playback device that is registered to the user (206). In some examples, playback device is registered using a unique serial number. In other examples, playback device is registered using a user ID associated with user. In yet other examples, playback device is registered using biometric features of the user, such as the user's fingerprint or the user's retinal blood vessel pattern. In some examples, identifying the playback device includes determining a user ID for the user and finding the playback device registered to that user ID. The user ID may be determined based on the user's entry of a first authentication factor.

If a playback device registered to the user is identified, a first code is generated by the server (208). In some examples, the first code may be generated based on the date the service session is initiated. In other examples, the first code may be generated based on the time the service session is initiated. In yet other examples, the first code may be generated based on a combination of both the date and the time that the service session is initiated. In other examples, the first code may be generated based on the number of times an event is executed. For example, the first code may be generated based on the number of times a service session has been requested by the particular user device. In some examples, the first code is generated based on the current timestamp of when service session was initiated and a cryptographic seed value known by both the playback device and server device. The first code may be composed of numbers. In other examples, the first code may be composed of letters. In other examples, the first code may be composed of tones. In some examples, the first code may be composed of symbols. In other examples, the first code may be composed of a combination of letters, numbers, tones, or symbols.

A signal conveying the first code is transmitted from the server to the identified playback device (210). The signal conveying the first code may be transmitted over a network. The identified playback device receives the signal transmitted by the server conveying the first code (212). A second code is generated by the playback device based on the first code (214). In some examples, the second code may be composed of numbers. In other examples, the second code may be composed of letters. In yet other examples, the second code may be composed of tones. In some examples, the second code may be composed of symbols. In other examples, the second code may be composed of a combination of letters, numbers, tones, or symbols. In some implementations, the first code and the second code are generated using a common protocol shared between playback device and server device. In some examples, the playback is configured to include a seed used together with the first code to generate a random or pseudo-random number. The number can be used as the second code. In some examples, the playback device shares the same cryptographic seed as the server device.

In the depicted example, the playback device generates an audio file that encodes the second code (216). The audio file encoding the second code may be composed of at least one tone. In some examples, the audio file encoding the second code is composed of at least one DTMF tone. The playback device outputs a playback of the audio file (218). In some examples, the playback device outputs the playback of the audio file at an audibly perceptible level such that it may be detected by a microphone of the user device. In some implementations, the playback device is placed in (e.g., close) proximity to the user device while the audio file is being output by the playback device. User device conveys the playback of the audio file output by the playback device through the service session (220). The playback of the audio file may be conveyed by the user device over a network. In some examples, the playback of the audio file is conveyed over a mobile network. In other examples, the playback of the audio file is conveyed over a public switched telephone network (PSTN) (e.g., a "plain ordinary telephone system" (POTS)). In some implementations, the playback of the audio file is conveyed over a telephone network through a service session, in which the user is engaged with a customer service representative. In yet other examples, the playback of the audio file is conveyed by the user device over a dot com channel.

The server receives the playback of the audio file conveyed through the service session by the user device (222). An interactive voice response (IVR) system maintained on the server may be used to receive the playback of the audio file. The playback of the audio file received by the server is analyzed by the server to extract the code encoded in the audio file (224). In some implementations, a cryptographic seed may be used to analyze the playback of the audio file and extract the code. For example, a cryptographic seed used by the server to generate the first code may be used to decode the second code generated by the playback device and encoded in the audio file. The code extracted from the playback of the audio file by the server may be compared to the first code generated by the server to verify user identity (226).

In some implementations, the playback device is configured to include a seed that is used in combination with the first code received from the server (212) to generate a random or pseudo-random number. The number can be used as a second code (216), which can then be encoded into the audio file (e.g., using DTMF codes) that is played back to verify the user's identity (218). The server knows the particular seed that is associated with the playback device, and performs its own generation of the random or pseudo-random number based on the seed to generate the first code (210). If the code that is extracted from the playback of the audio file (224) matches the first code that is independently generated on the server based on the seed of playback device (210), the user's identity is verified (226). In some examples, the generation of the number is performed on playback device and server with a particular periodicity, such that the code rotates over time (e.g., every minute) to prevent spoofing of the code and unauthorized access.

Figure 3:
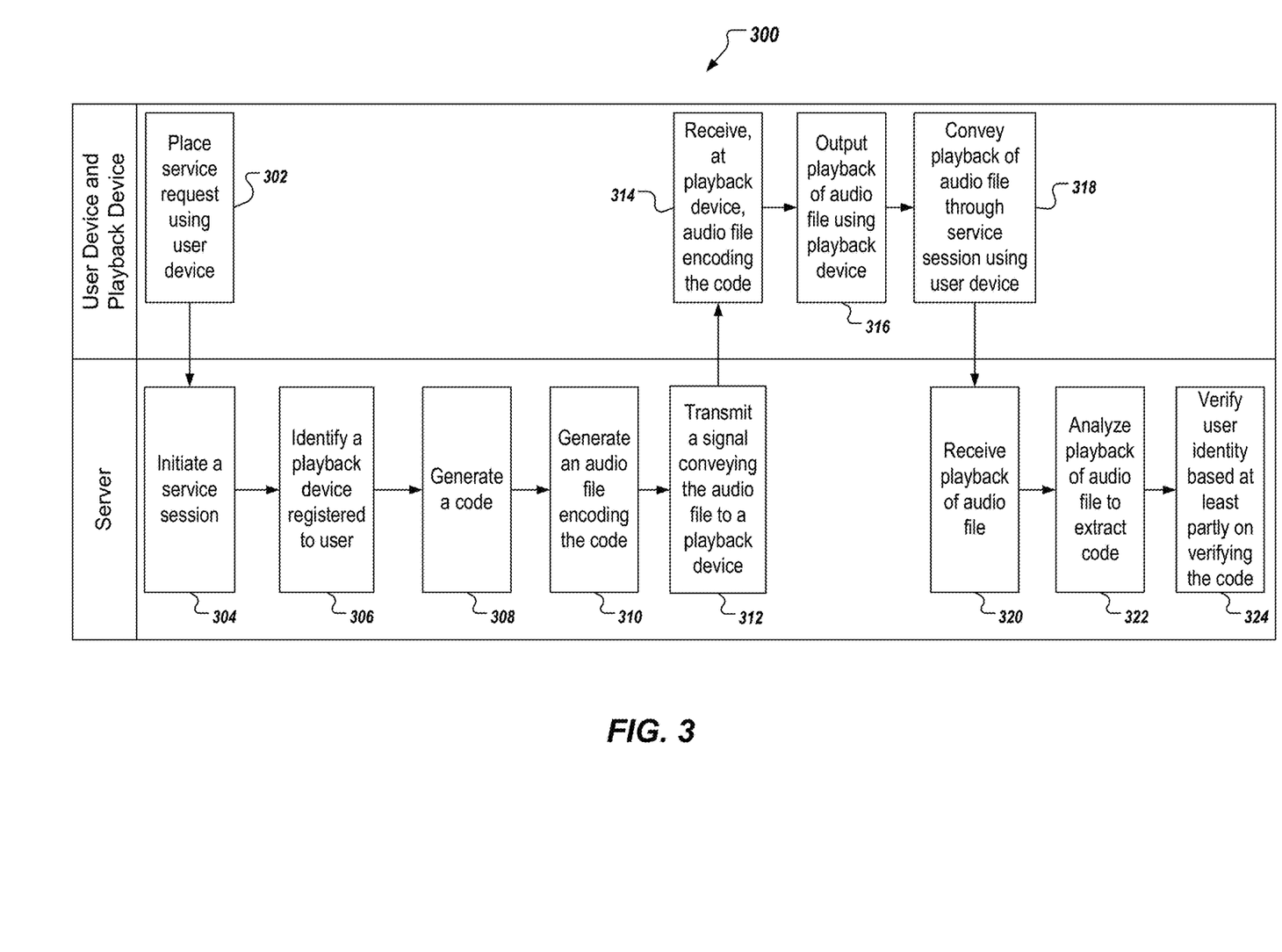

FIG. 3 depicts an example process 300 that can be executed in accordance with implementations of the present disclosure. The example process 300 can be provided by one or more computer-executable programs executed by one or more computing devices. In some examples, the example process 300 can be performed to conduct second stage authentication for verifying a user's identity.

A request to initiate a service session is placed by user using a user device (302). The user device may be a telephone. In other examples, the user device may be a computing device and the request to initiate a service session can be placed using an online or mobile application on a computing device. In response to a request to initiate a service session, a server initiates a service session (304). The user may be authenticated through a first mode of authentication during the service session. In some implementations, the first mode of authentication can include entry of a password. In other implementations, the first mode of authentication can include entry of a personal identification number. The first mode can also include biometric authentication techniques, such as authentication based on fingerprint, retinal scan, facial recognition, voice recognition, and so forth.

The server identifies a playback device that is registered to the (306). In some examples, playback device is registered using a unique serial number. In other examples, playback device is registered using a user ID associated with user. In yet other examples, playback device is registered using biometric features of the user, such as the user's fingerprint or the user's retinal blood vessel pattern. In some examples, identifying the playback device includes determining a user ID for the user and finding the playback device registered to that user ID. The user ID may be determined based on the user's entry of a first authentication factor.

If a playback device registered with the user is identified, a code is generated by the server (308). In some examples, the code may be generated based on the date the service session is initiated. In other examples, the code may be generated based on the time the service session is initiated. In yet other examples, the code may be generated based on a combination of both the date and the time that the service session is initiated. In other examples, the code may be generated based on the number of times an event is executed. For example, the code may be generated based on the number of times a service session request has been placed by the user device. In some implementations, the server device is configured to include a seed that is used to generate a random or pseudo-random number. The number can be used to generate the code. In some examples, the code may be composed of numbers. In other examples, the code may be composed of letters. In yet other examples, the code may be composed of tones. In some examples, the code may be composed of symbols. In other examples, the code may be composed of a combination of letters, numbers, tones, or symbols.

The server generates an audio file that encodes the code (310). The audio file encoding the code may be composed of at least one tone. In some examples, the audio file encoding the code is composed of at least one DTMF tone. A signal conveying the audio file encoding the code is transmitted from the server to the identified playback device (312). The signal conveying the audio file encoding the code may be transmitted over a network.

The identified playback device receives the signal transmitted by the server conveying the audio file encoding the code (314). The playback device outputs a playback of the audio file received from the server encoding the code (316). In some examples, the playback device outputs the playback of the audio file at an audibly perceptible level such that it may be detected by a microphone of the user device. In some implementations, the playback device is placed in close proximity to the user device while the audio file is being output by the playback device. The playback of the audio file output by the playback device is conveyed by the user device through the service session (318). The playback of the audio file may be conveyed by the user device over a network. In some examples, the playback of the audio file is conveyed over a mobile network. In some implementations, the playback of the audio file is conveyed over a telephone network through a service session, in which the user is engaged with a customer service representative. In other examples, the playback of the audio file is conveyed by the user device over a dot com channel.

The server receives the playback of the audio file conveyed through the service session by the user device (320). An interactive voice response (IVR) system maintained on the server may be used to receive the playback of the audio file. The playback of the audio file received by the server is analyzed by the server to extract the encoded code (322). In some implementations, a cryptographic seed may be used to analyze the playback of the audio file and extract the encoded code. For example, a cryptographic seed that was used by the server to generate the code may be used to decode the code encoded in the playback of the audio file. The code extracted from the playback of the audio file by the server is compared to the code generated by the server to verify user identity (324). In some examples, if the code that is extracted from the playback of the audio file (322) matches the code that was generated on the server based (310), the user's identity is verified (324).

Figure 4:
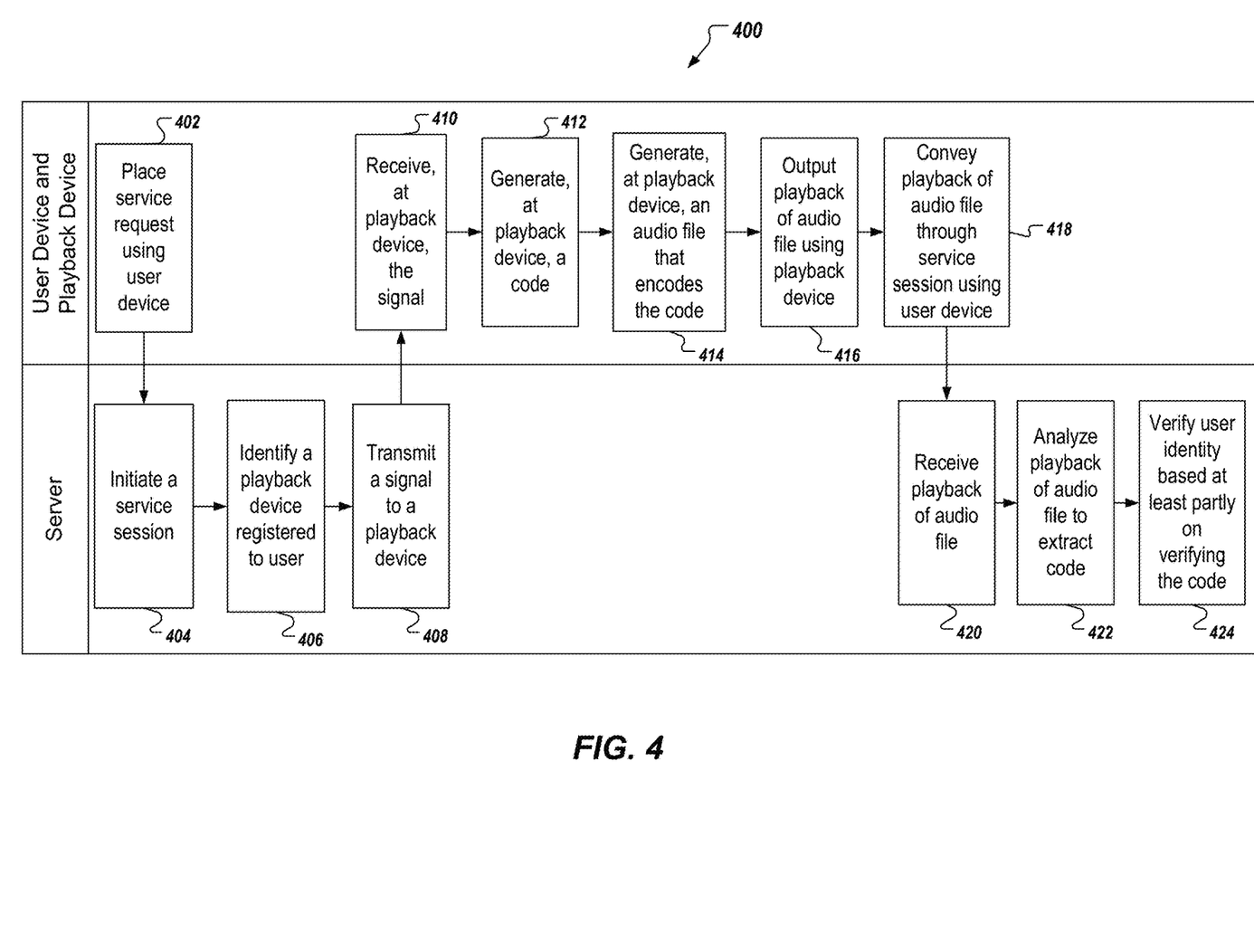

FIG. 4 depicts an example process 400 that can be executed in accordance with implementations of the present disclosure. The example process 400 can be provided by one or more computer-executable programs executed by one or more computing devices. In some examples, the example process 400 can be performed to conduct second stage authentication for verifying a user's identity.

A request to initiate a service session is placed by a user using user device (402). The user device may be a telephone. In other examples, the user device may be a computing device and the request to initiate a service session may be placed using an online or mobile application on a computing device. In response to a request to initiate a service session, a server initiates a service session (404). The user may be authenticated through a first mode of authentication during the service session. In some implementations, the first mode of authentication can include entry of a password. In other implementations, the first mode of authentication can include entry of a personal identification number. The first mode can also include biometric authentication techniques, such as authentication based on fingerprint, retinal scan, facial recognition, voice recognition, and so forth.

The server identifies a playback device that is registered to the user (406). In some examples, playback device is registered using a unique serial number. In other examples, playback device is registered using a user ID associated with user. In yet other examples, playback device is registered using biometric features of the user, such as the user's fingerprint or the user's retinal blood vessel pattern. In some examples, identifying the playback device includes determining a user ID for the user and finding the playback device registered to that user ID. The user ID may be determined based on the user's entry of a first authentication factor.

If a playback device registered with the user is identified, a signal is transmitted from the server to the playback device (408). The signal may be transmitted over a network. The identified playback device receives the signal transmitted by the server (410). The playback device generates a code (412). In some examples, the code may be generated based on the date the service session is initiated. In other examples, the code may be generated based on the time the service session is initiated. In yet other examples, the code may be generated based on a combination of both the date and the time that the service session is initiated. The code may be generated based on a combination of the date and time that the signal sent from the server was received by the playback device. In other examples, the code may be generated based on the number of times an event is executed. For example, the code may be generated based on the number of times a service session has been placed by the user device. In some examples, the code is generated based on the current timestamp of when service session was initiated and a cryptographic seed value known by both the playback device and server device. The seed may be used to generate a random pseudo-random number and this number can be used to generate the code. The code may be composed of numbers. In other examples, the code may be composed of letters. In yet other examples, the code may be composed of tones. In some examples, the code may be composed of symbols. In other examples, the code may be composed of a combination of letters, numbers, tones, or symbols.

The playback device generates an audio file that encodes the code (414). In some examples, the audio file encoding the code is composed of at least one tone. In some examples, the audio file encoding the code is composed of at least one DTMF tone. The playback device outputs a playback of the audio file (416). In some examples, the playback device outputs the playback of the audio file at an audibly perceptible level such that it may be detected by a microphone of the user device. In some implementations, the playback device is placed in close proximity to the user device while the audio file is being output by the playback device. The playback of the audio file output by the playback device is conveyed by the user device through the service session (418). The playback of the audio file may be conveyed by the user device over a network. In some examples, the playback of the audio file is conveyed over a mobile network. In some implementations, the playback of the audio file is conveyed over a telephone network through a service session, in which the user is engaged with a customer service representative. In yet other examples, the playback of the audio file is conveyed by the user device over a dot com channel.

The server receives the playback of the audio file conveyed through the service session by the user device (420). An interactive voice response (IVR) system maintained on the server may be used to receive the playback of the audio file. The playback of the audio file received by the server is analyzed to extract the code encoded in the audio file (422). In some implementations, a cryptographic seed may be used to analyze the playback of the audio file and extract the code. For example, a cryptographic seed used by the playback device to generate the code may be used to decode the code encoded in the playback of the audio file.

The code extracted by the server from the playback of the audio file is compared to the code generated by the playback device to verify user identity (424). In some implementations, the playback device is configured to include a seed that is used to generate a random or pseudo-random number. The number can be used to generate a code (412), which is encoded into the audio file (414) (e.g., using DTMF codes) that is played back to verify the user's identity. The server knows the particular seed that is associated with the playback device, and performs its own generation of the random or pseudo-random number based on the seed. If the code that is extracted from the playback of the audio file (422) matches the code that is independently generated on the backend server based on the seed of the playback device 104, the user's identity is verified. In some examples, the generation of the number is performed on the playback device and server with a particular periodicity, such that the code rotates over time (e.g., every minute) to prevent spoofing of the code and unauthorized access.

Figure 5:
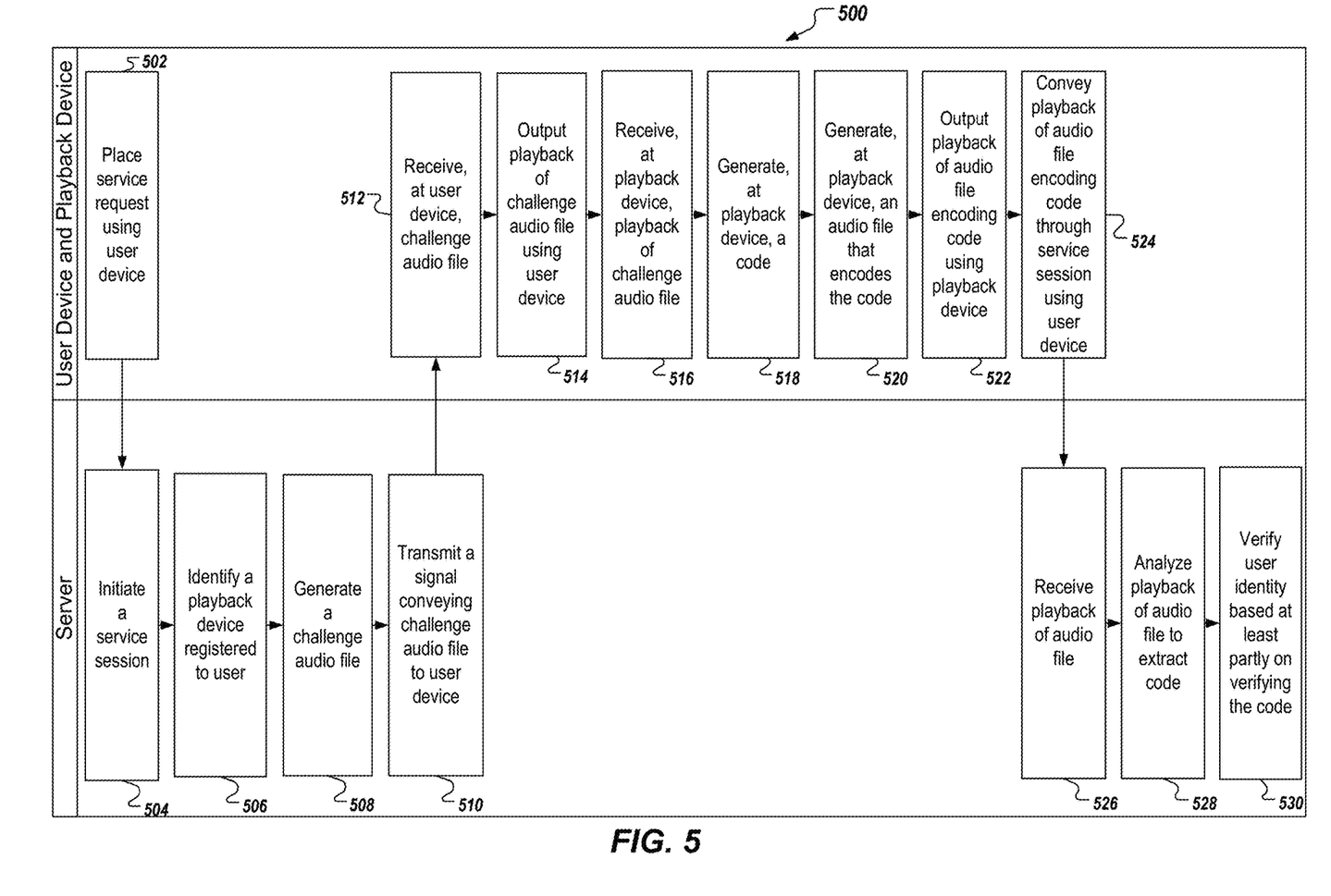

FIG. 5 depicts an example process 500 that can be executed in accordance with implementations of the present disclosure. The example process 500 can be provided by one or more computer-executable programs executed by one or more computing devices. In some examples, the example process 500 can be performed to conduct second stage authentication for verifying a user's identity, in a multi-factor authentication process.

A request to initiate a service session is placed by a user using user device (502). The user device may be a telephone. In other examples, the user device may be a computing device and the request to initiate a service session may be placed using an online or mobile application on a computing device. In response to a request to initiate a service session, a server initiates a service session (504). The user may be authenticated through a first mode of authentication during the service session. In some implementations, the first mode of authentication can include entry of a password. In other implementations, the first mode of authentication can include entry of a personal identification number. The first mode can also include biometric authentication techniques, such as authentication based on fingerprint, retinal scan, facial recognition, voice recognition, and so forth.

The server identifies a playback device that is registered to the user (506). In some examples, playback device is registered using a unique serial number. In other examples, playback device is registered using a user ID associated with user. In yet other examples, playback device is registered using biometric features of the user, such as the user's fingerprint or the user's retinal blood vessel pattern. In some examples, identifying the playback device includes determining a user ID for the user and finding the playback device registered to that user ID. The user ID may be determined based on the user's entry of a first authentication factor.

If a playback device registered with the user is identified, the server generates a challenge audio file (508). In some implementations, the server includes a cryptographic seed value known by both the playback device and server device. The seed may be used to generate a random pseudo-random number that can be encoded in the audio file. The challenge audio file may be composed of at least one tone. In some examples, the challenge audio file is composed of at least one DTMF tone. A signal conveying the challenge audio file generated by the server is transmitted from the server to the user device (510). The user device receives the signal transmitted by the server conveying the challenge audio file (512). The user device outputs a playback of the challenge audio file (514). In some examples, the user device outputs the playback of the challenge audio file at an audibly perceptible level such that it may be detected by a microphone of the playback device. In some implementations, the user device is placed in close proximity to the playback device while the audio file is being output by the user device.

The identified playback device receives the playback of the challenge audio file (516). In some examples, the audio file is encrypted with a code that is extracted by the playback device using a cryptographic seed known both by the playback device and the server. In response to receiving the playback of the challenge audio file, the playback device generates a code (518). In some examples, the code may be generated based on the date the service session is initiated. In other examples, the code may be generated based on the time the service session is initiated. In yet other examples, the code may be generated based on a combination of both the date and the time that the service session is initiated. The code may be generated based on a combination of the date and time that the signal sent from the server was received by the playback device. In other examples, the code may be generated based on the number of times an event is executed. For example, the code may be generated based on the number of times a service session has been placed by the user device. The code may be composed of numbers. In other examples, the code may be composed of letters. In yet other examples, the code may be composed of tones. In some examples, the code may be composed of symbols. In other examples, the code may be composed of a combination of letters, numbers, tones, or symbols.

The playback device generates an audio file that encodes the code (520). In some examples, the audio file encoding the code is composed of at least one tone. In some examples, the audio file encoding the code is composed of at least one DTMF tone. The playback device outputs a playback of the audio file (522). In some examples, the playback device outputs the playback of the audio file at an audibly perceptible level such that it may be detected by a microphone of the user device. In some implementations, the playback device is placed in close proximity to the user device while the audio file is being output by the playback device. The playback of the audio file output by the playback device is conveyed by the user device through the service session (524). The playback of the audio file may be conveyed by the user device over a network. In some examples, the playback of the audio file is conveyed over a mobile network. In some implementations, the playback of the audio file is conveyed over a telephone network through a service session, in which the user is engaged with a customer service representative. In yet other examples, the playback of the audio file is conveyed by the user device over a dot com channel.

The server receives the playback of the audio file conveyed through the service session by the user device (526). An interactive voice response (IVR) system maintained on the server may be used to receive the playback of the audio file. The playback of the audio file received by the server is analyzed to extract the code encoded in the audio file (528). In some implementations, a cryptographic seed may be used to analyze the playback of the audio file and extract the code. For example, a cryptographic seed used by the playback device to generate the code may be used to decode the code encoded in the playback of the audio file.

The code extracted by the server from the playback of the audio file is compared to the code generated by the playback device to verify user identity (530). In some implementations, the playback device is configured to include a seed that is used to generate a random or pseudo-random number. The number can be used to generate a code (518), which is encoded into the audio file (520) (e.g., using DTMF codes) that is played back to verify the user's identity. The server knows the particular seed that is associated with the playback device, and performs its own generation of the random or pseudo-random number based on the seed. If the code that is extracted from the playback of the audio file (528) matches the code that is independently generated on the backend server based on the seed of the playback device, the user's identity is verified. In some examples, the generation of the number is performed on the playback device and server with a particular periodicity, such that the code rotates over time (e.g., every minute) to prevent spoofing of the code and unauthorized access.

Figure 6:
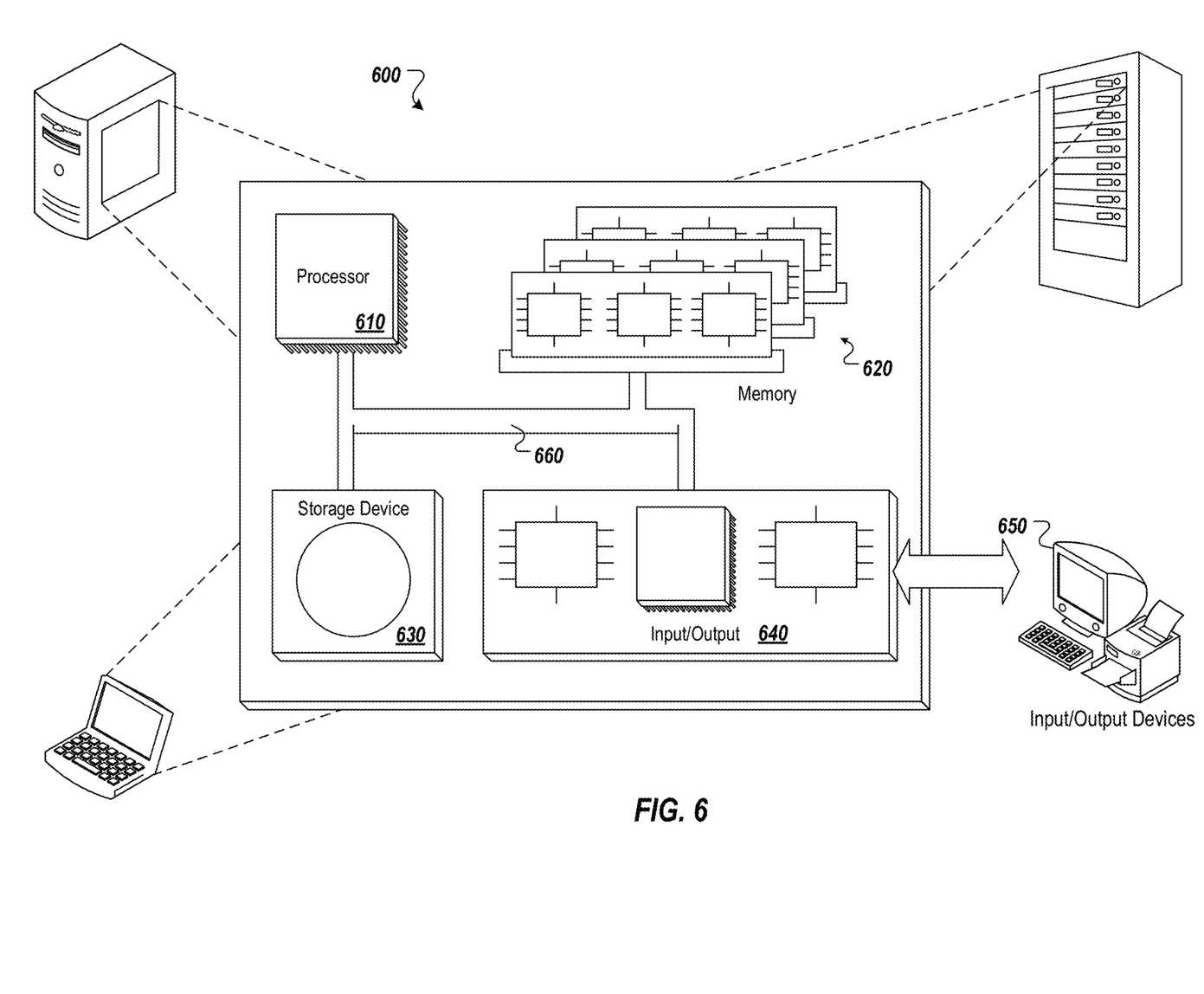
FIG. 6 depicts an example computing system, according to implementations of the present disclosure.

FIG. 6 depicts an example computing system 600, according to implementations of the present disclosure. The system 600 may be used for any of the operations described with respect to the various implementations discussed herein. For example, the system 600 may be included, at least in part, in the user device 102, the playback device 104, the server device(s) 110, the backend system 108, and/or other computing device(s) or system(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 13144 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device such as, without limitation, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices (e.g., EPROM, EEPROM), and flash memory devices; magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a backend component (e.g., as a data server), or that includes a middleware component (e.g., an application server), or that includes a front-end component (e.g., a client computer having a graphical user interface or a Web browser through which a user can interact with an implementation of the subject matter described in this specification), or any combination of one or more such backend, middleware, or front-end components. The components of the system can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   sending, by a user device, a service request to a server computing system;
   establishing, by the user device, a service session with the server computing system;
   receiving, by the user device, an audio signal from a playback device, the audio signal comprising a code that corresponds to a user of the user device encoded within the audio signal;
   sending, by the user device and through the service session, a playback of the audio signal that encodes the code, thereby enabling the server computing system to verify an identity of the user by extracting the code from the playback of the audio signal.

2. The method of claim 1, further comprising:
   receiving, by the playback device, an audio file encoding the audio signal from the server computing system; and
   outputting, by the playback device, the audio signal from the audio file.

3. The method of claim 1, further comprising:
   receiving, by the playback device, the code from the server computing system;
   generating, by the playback device, an audio file comprising the audio signal with the code encoded therein; and
   outputting, by the playback device, the audio signal from the audio file.

4. The method of claim 1, wherein the code is a second code, the method further comprising:
   receiving, by the playback device, a first code from the server computing system;
   generating, by the playback device, a second code based on the first code;
   generating, by the playback device, an audio file comprising the audio signal with the second code encoded therein; and
   outputting, by the playback device, the audio signal from the audio file.

5. The method of claim 1, further comprising:
   receiving, by the playback device, a signal from the server computing system;
   generating, by the playback device, the code in response to receiving the signal;
   generating, by the playback device, an audio file comprising the audio signal with the code encoded therein; and
   outputting, by the playback device, the audio signal from the audio file.

6. The method of claim 1, wherein:
   the user is initially authenticated through a first mode of authentication during the service session; and
   the sending the playback of the audio signal that encodes the code comprises a second mode of authentication for authenticating the user.

7. The method of claim 1, wherein the playback device is registered to a user ID associated with the user and stored at the server computing system.

8. The method of claim 1, wherein the playback device is a portable computing device.

9. The method of claim 1, wherein the user device is a computing device operated by the user.

10. The method of claim 1, wherein the user device is a telephone operated by the user.

11. The method of claim 1, wherein the audio signal comprises one or more dual tone multiple frequency (DTMF) tones.

12. A user device comprising:
    at least one processor; and
    a non-transitory computer-readable storage medium coupled to the at least one processor and having instructions stored thereon which, when executed by the at least one processor, cause the at least one processor to perform operations comprising:
      sending, by the user device, a service request to a server computing system;
      establishing, by the user device, a service session with the server computing system;
      receiving, by the user device, an audio signal from a playback device, the audio signal comprising a code that corresponds to a user of the user device encoded within the audio signal;
      sending, by the user device and through the service session, a playback of the audio signal that encodes the code, thereby enabling the server computing system to verify an identity of the user by extracting the code from the playback of the audio signal.

13. The user device of claim 12, wherein:
    the user is initially authenticated through a first mode of authentication during the service session; and
    the sending the playback of the audio signal that encodes the code comprises a second mode of authentication for authenticating the user.

14. The user device of claim 12, wherein the user device is a telephone operated by the user.

15. The user device of claim 12, wherein the audio signal comprises one or more dual tone multiple frequency (DTMF) tones.

16. A system, comprising:
    a user device; and
    a playback device,
    wherein the user device is configured to perform operations comprising:
      sending a service request to a server computing system;
      establishing a service session with the server computing system;
      receiving an audio signal from the playback device, the audio signal comprising a code that corresponds to a user of the user device encoded within the audio signal;
      sending, through the service session, a playback of the audio signal that encodes the code, thereby enabling the server computing system to verify an identity of the user by extracting the code from the playback of the audio signal.

17. The system of claim 16, wherein the playback device is configured to perform operations comprising:
  receiving an audio file encoding the audio signal from the server computing system; and
  outputting the audio signal from the audio file.

18. The system of claim 16, wherein the playback device is configured to perform operations comprising:
  receiving the code from the server computing system;
  generating an audio file comprising the audio signal with the code encoded therein; and
  outputting, by the playback device, the audio signal from the audio file.

19. The system of claim 16, wherein the code is a second code, and wherein the playback device is configured to perform operations comprising:
  receiving a first code from the server computing system;
  generating a second code based on the first code;
  generating an audio file comprising the audio signal with the second code encoded therein; and
  outputting the audio signal from the audio file.

20. The system of claim 16, wherein the playback device is configured to perform operations comprising:
  receiving a signal from the server computing system;
  generating the code in response to receiving the signal;
  generating an audio file comprising the audio signal with the code encoded therein; and
  outputting the audio signal from the audio file.

* * * * *